June 7, 1966  C. H. BIDER ETAL  3,254,580
ELECTRONIC FLASH PHOTOGRAPHY APPARATUS
Filed Dec. 4, 1963  2 Sheets-Sheet 1
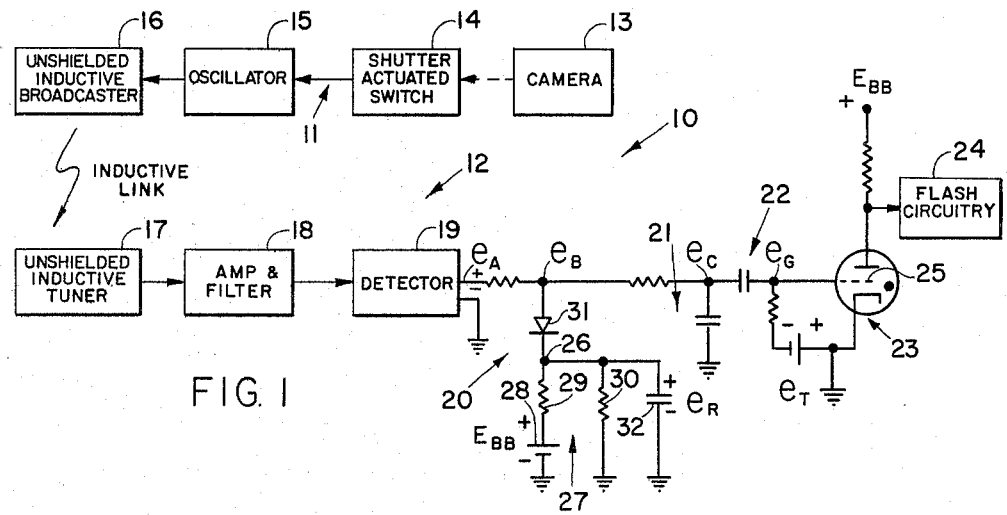
FIG. 1
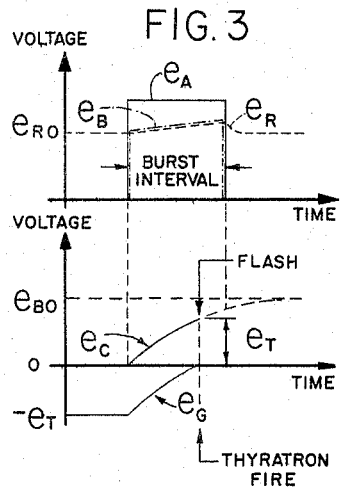
FIG. 3
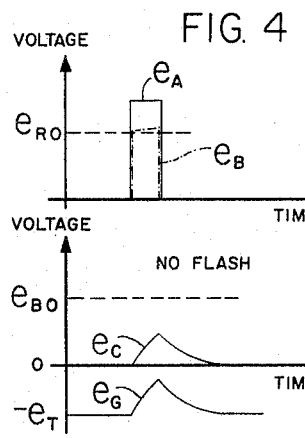
FIG. 4
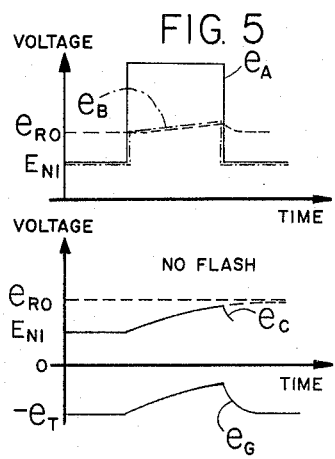
FIG. 5
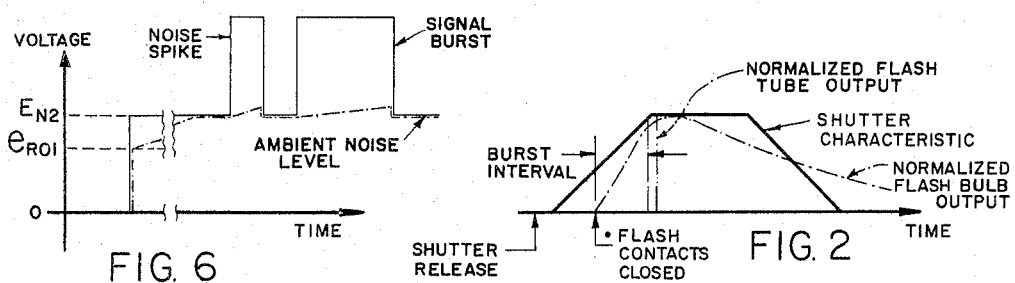
FIG. 6
FIG. 2
INVENTORS
Conrad H. Biber
and
Sholly Kagan
BY
Brown and Mikulka
Donald M. Sandler
ATTORNEYS June 7, 1966 C. H. BIDER ET AL 3,254,580
ELECTRONIC FLASH PHOTOGRAPHY APPARATUS
Filed Dec. 4, 1963 2 Sheets-Sheet 2

INVENTORS
Conrad H. Biber
Sholly Kagan
BY Brown and Mikulka
and
Donald M. Sandler
ATTORNEYS

United States Patent Office 3,254,580
Patented June 7, 1966

3,254,580
ELECTRONIC FLASH PHOTOGRAPHY
APPARATUS
Conrad H. Bider, Needham, and Sholly Kagan, Natick,
Mass., assignors to Polaroid Corporation, Cambridge,
Mass., a corporation of Delaware
Filed Dec. 4, 1963, Ser. No. 328,044
7 Claims. (Cl. 95—11.5)

This invention relates generally to remote controlled electronic flash photography apparatus, and more particularly to apparatus of the type described wherein a burst of CW signal whose duration exceeds a predetermined time causes said apparatus to produce, at the end of said predetermined time, an impulse of light for illuminating the scene being photographed.

Most conventional cameras now in use by the public are capable of photographing a scene illuminated by a vaporizable flashbulb because they are provided with a pair of flash contacts (termed "M" contacts for reference) which are closed by the shutter mechanism a predetermined time prior to maximum blade opening. Proper selection of this time by the camera designer permits the light output or response of the flashbulb, whose duration is of the same order of magnitude as the time required to uncover and cover the exposure aperture of the camera, to be matched with the shutter characteristic so that under flashbulb, illumination, and amount of light sufficient to properly expose the film being used will be passed by the shutter. Many conventional cameras are also adapted to photograph a scene illuminated by a flashtube or strobe light of the type producing an impulse of light, which is to say a pulse of light of high intensity and very short duration compared to the response of a flashbulb. Since the duration of the impulse is so short, the nature of the shutter characteristic is not important provided the impulse occurs at maximum shutter opening. To that end, it is conventional to provide cameras with another pair of contacts (termed "X" contacts for reference) that close at the instant the shutter reaches maximum opening, and to provide means for the camera user to select the contacts in relation to the type of artificial illumination to be used.

Where it is desired to operate a flashtube from a position remote from the camera by using a radio link, it is possible to cause ionization of the tube to occur at the instant of maximum shutter opening by utilizing the "X" contacts to key a transmitter into operation. Ideally, a receiver at the remote location would receive the transmitted signal produce a trigger pulse that causes discharge of the flashtube at the instant of maximum shutter opening, since the signal is propagated at the speed of light. The difficulty with this approach is that ambient noise causes spurious triggering of the flashtube. For this reason, the approach to noise suppression, disclosed in copending application Serial No. 203,988 filed June 20, 1962, now Patent No. 3,185,056, and assigned to the same assignee as the present application, was developed. Such approach utilizes the closing of the "M" contacts of a camera to key a transmitter into producing a burst of CW signal whose duration is at least the interval between the closing of the contacts and maximum shutter opening. The CW signal is detected by the receiver at the remote location and applied to a limiter circuit whose output is a pulse having a duration equal to the duration of the CW burst and an amplitude equal to the limiting level of the limiter. All pulses appearing at the output of the limiter due to CW bursts will be identical as long as the transmitter (usually attached to the camera) is close enough to the receiver to permit limiting action to occur. The output of the limiter is next integrated. Since the amplitude of voltage changes at the input to the integrator is kept constant by the limiting action described above, the output of the integrator will always require the same time to change by a given amount. Thus, the voltage at the output of the integrator will change by a predetermined amount (termed the trigger difference) in the time interval between the initiation of a CW burst and the attainment of maximum shutter opening, regardless of the relative distance between the transmitter and the receiver. By arranging to have the trigger difference drive the bias of a normally not-conducting thyratron to cut-off, the thyratron will fire at the instant of maximum shutter opening, and the resultant change in conduction can be used in a conventional manner to trigger a flashtube. The advantage of this approach lies in its ability to suppress spurious triggering of the flash tube due to intermittent noise whose duration is short in comparison to the time between closing of the "M" contacts and maximum shutter opening. When noise of this type is present, it is amplitude limited before being integrated, so that the output of the integrator changes by an amount less than the trigger difference before termination of the noise, thus avoiding spurious triggering.

While the voltage limiting feature of above-described copending application is cooperable with the integrator to resolve signal bursts from the camera in the presence of intermittent short duration noise, it prevents the receiver from responding to signal bursts in the presence of steady-state noise whose duration is long compared to the duration of the bursts. Basically, the level at which limiting occurs is fixed relative to the reference from which the output of the detector is measured. When steady-state noise is present such that the output of the detector has a particular value of ambient voltage less than the level at which limiting occurs, all short-duration noise as well as pulses produced in response to CW bursts and superimposed on the steady-state noise will be amplitude limited. Thus the output of the integrator is permitted to change only by such difference, and if this is less than the trigger level, the thyratron will remain cut-off regardless of the duration of the output pulses from the detector. On the other ahnd, when steady-state noise is present such that the output of the detector has a value of ambient voltage greater than the limiter level associated with the absence of steady-state noise, such value of ambient voltage becomes the new limiter level, and both CW bursts and intermittent short duration noise are held to the new limiter level. As a result, there is essentially no output from the integrator under these conditions, and the grid of the thyratron can never be driven above cut-off.

The primary object, therefore, of the present invention is to provide remotely controlled electronic flash photography apparatus of the type described which does not suffer from the above-described disadvantage. In particular, the object of the invention is to provide apparatus of the type described wherein the limiter circuit is such that the receiver will respond in substantially the same manner independently of the presence or absence of long-term steady-state noise.

Briefly, the invention involves the use of a "bootstrap" circuit wherein the level at which limiting occurs is made dependent upon the output of the detector such that the level at which limiting occurs floats up and down automatically relative to the ambient voltage of the detector associated with steady-state noise. This is achieved by shunting the output of the detector with a series circuit comprising, as one element, the parallel combination of a frequency insensitive impedance and a voltage sensitive unidirectional current device, and as another element, a frequency sensitive impedance in series with a frequency sensitive voltage source. With this construction, an ambient voltage at the detector output causes the voltage source to develop a voltage that cuts off the current device and establishes a limiting level different from the ambient voltage. When intermittent short duration noise and CW bursts are superimposed on the long duration noise, the former are amplitude limited by the conduction of the current device. In this manner, the integrated output of the detector will reach a level sufficient to trigger the flash tube only in response to CW bursts, and the receiver is thus capable of resolving CW bursts in the presence of both short term intermittent noise and noise of longer duration.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIGURE 1 is a block diagram of conventional electronic flash photography apparatus;

FIG. 2 is a time diagram showing proper synchronization of a vaporizable filament bulb and an ionizable tube with the shutter characteristic of a camera;

FIGS. 3, 4 and 5 are time diagrams associated with the apparatus of FIGURE 1, each figure having a first diagram showing the input voltage to the integrator and a second diagram showing the output voltage of the integrator;

FIG. 6 is a time diagram showing the input to the integrator under long term steady-state noise conditions;

Figure 7:
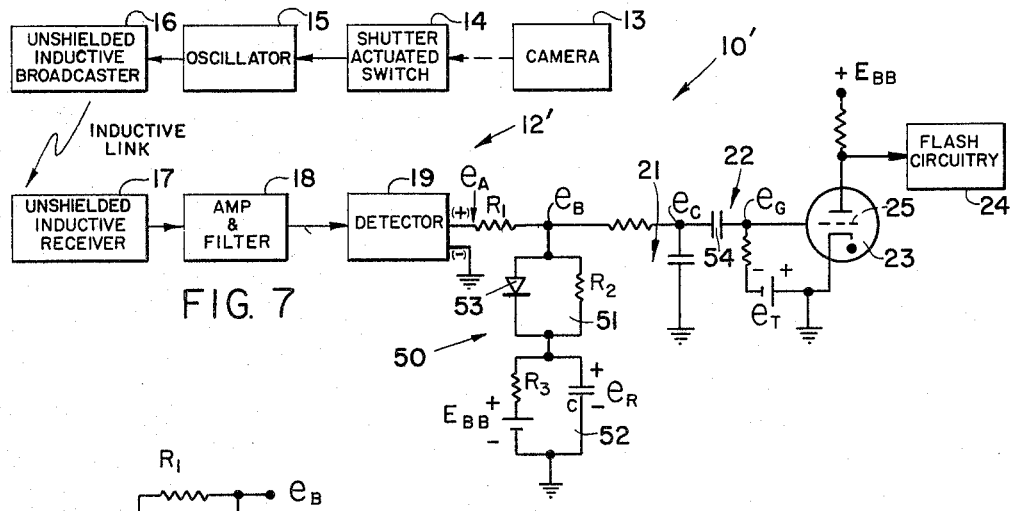
FIG. 7 is a block diagram of electronic flash apparatus wherein the improved limiter is used.

In order to better understand the contribution to the art made by the present invention, conventional remote controlled electronic flash photography apparatus such as that shown in copending application Serial No. 203,988, filed June 20, 1962, now Patent No. 3,185,056, will be briefly described in order to indicate the problems associated with resolving signal bursts in the presence of noise. Such conventional apparatus is designated generally by reference numeral 10 in FIGURE 1, and comprises camera apparatus 11 and receiver apparatus 12 remote from the camera apparatus. Apparatus 11 comprises camera 13, which may be of any type having a pair of flash contacts, designated schematically at 14, which are closed by the action of the shutter mechanism of the camera prior to maximum shutter opening; oscillator means 15 designed to produce, in response to the closing of the contacts, a burst of CW signal commencing a preselected time prior to maximum opening and lasting at least until the shutter reaches maximum opening; and broadcast means 16 which may take the form of an unshielded ferrite core coupled to a circuit tuned to a frequency in the VLF region of the spectrum and to the oscillator means when transmission is to be via an induction field.

The sequence of events occurring upon actuation of the shutter release by the camera operator is summarized in FIG. 2 which shows a shutter characteristic typical of many cameras, it being understood, of course, that the present invention is not dependent upon the type of camera used except that the latter must have "M" contacts. Since most shutters are not 100% efficient due to the finite time required to uncover and cover the exposure aperture, the light passing through the exposure aperture may have an increasing ramp relationship with time until maximum shutter opening is achieved. Depending upon the shutter speed, the light will be constant for a short time subsequent to maximum shutter opening and then decrease as the closing blade covers the exposure aperture. Superimposed on the shutter characteristic are properly synchronized light output curves associated with a vaporizable flashbulb and a flashtube. In the case of a flashbulb, ignition must commence a short time prior to maximum shutter opening in order that the combination of the transient light pulse and the shutter characteristic permit the proper amount of light to pass through the exposure aperture. In the case of a flashtube, ionization at the instant of maximum shutter opening permits the shutter mechanism to pass the proper amount of light since the light pulse associated with a flashtube is of such short duration. It is pointed out that the amount of light contained in the flashtube pulse should be substantially equal to the amount of light contained in the flashbulb pulse as modified by the shutter characteristic in order to achieve proper exposure.

While the curves of FIG. 2 indicate that radio transmission occurs with the closing of the "M" contacts, it should be understood that this is shown for convenience since transmission may be delayed either mechanically or electronically. As stated previously, apparatus 11 produces a burst of CW signal of predetermined frequency commencing a preselected time prior to maximum shutter opening. The induction field associated with broadcaster 16 is propagated to tuner 17 of receiver apparatus 12. The latter includes, in addition to tuner 17 which is tuned to the predetermined frequency of the CW signal, amplifier and filter apparatus 18, detector 19, conventional limiter 20, integrator 21, coupling network 22, thyratron tube means 23 and flash circuitry 24, the latter including a flashtube.

Tuner 17 and amplifier and filter apparatus 18 cooperate to selectively pass signals of said predetermined frequency which are applied to the input to detector 19. The latter detects the envelope of these signals and is signal $e_A$ shown in the drawing. Signal $e_A$ is amplitude-limited by limiter 20 and appears as signal $e_B$ at the input to integrator 21. Signal $e_C$ is the output of the integrator which is AC coupled to the grid of thyratron 25 to produce signal $e_G$ which fires thyratron 25 when the signal $e_G$ exceeds the bias voltage $e_T$ which normally holds tube 25 in its cut-off condition. The abrupt conduction of tube 25 produces an abrupt change in the voltage of the plate resistor of tube 25, such change being sensed in a conventional manner in circuitry 24 to cause a flashtube to be ionized and produce a short high intensity impulse of light.

To understand the operation of the above-described circuit, reference is now made to the upper portion of FIG. 3 where curve $e_A$ represents the time variation of the output of detector 19 in response to the transmission of a CW burst by apparatus 11. Thus, curve $e_A$ represents the envelope of the CW burst, starting when the flash contacts are closed (or delayed as previously described) and ending when the safety switch (not shown) of the camera is opened just after maximum shutter opening occurs. The voltage level $e_{R0}$ is established at node 26 by voltage divider 27 of limiter 20 which includes battery 28 and resistor 29 connected at node 26 to resistor 30. Diode 31 connects node 26 to the output of detector 19 and the input to integrator 21. As long as the voltage out of the detector fails to exceed the voltage $e_{R0}$ at node 26, diode 31 is reverse biased and the output of the detector is applied directly to the input of the integrator. When a CW burst occurs, and the camera is located properly relative to the receiver, the voltage out of the detector exceeds the reference voltage and diode 31 becomes forward biased. Capacitor 32 coupled to node 26 prevents voltage from rising rapidly when diode 31 conducts. That is to say, the time constant associated with the charging of capacitor 32 when diode 31 conducts is long compared to the duration of CW bursts (which is termed the burst interval for reference) with the result that the input voltage $e_B$ to the integrator is essentially a step function of amplitude $e_{R0}$. The lower portion of FIG. 3 shows the response of the integrator to the input $e_B$. Thus, the output voltage $e_C$, which is the voltage across the capacitor of the integrator, increases exponentially with time toward essentially the voltage $e_{R0}$. Coupling circuit 22 has a long time constant compared to the duration of CW bursts with the result that the voltage $e_G$ on the grid of tube 23 tracks the voltage $e_C$. When the bias voltage reaches cut-off, tube 23 conducts causing circuitry 24 to produce an impulse of light. By proper selection of resistors 29 and 30, and the level of fixed grid bias $e_T$, it is possible to cause the voltage $e_C$ to change by a sufficient amount (termed the trigger difference) to cause triggering of tube 23 substantially at the same time maximum shutter opening occurs. Obviously, the value of $e_{R0}$ must exceed the absolute value of $e_T$.

When a noise pulse of large amplitude is detected (upper portion of FIG. 4), the pulse is limited by limiter 20 exactly as before. However, because the duration of the noise pulse is less than the burst interval, the voltage $e_C$ fails to change by the trigger difference before the noise pulse terminates and tube 23 remains biased to cut-off. When the camera is moved beyond a certain range from the receiver, the detected CW burst will not exceed the voltage at node 26 and will be directly integrated at 21. In such case, the voltage $e_C$ may or may not change by the trigger difference. Where the change is less than $e_T$, the voltage $e_G$ cannot rise to cut-off even though the integrated pulse is of the correct duration. Where the change is greater than $e_T$, the voltage $e_G$ may reach cut-off causing the flashtube to be triggered if the input pulse is of sufficient duration. However, an impulse of light so produced may not be synchronized properly with the shutter opening, and this can be precluded by causing the safety switch of the camera to open shortly after maximum shutter opening so that the CW burst is terminated before the shutter commences to cover the exposure aperture.

The problems raised with this approach are shown in FIGS. 5 and 6. The top portion of FIG. 5 illustrates at $e_A$ the response of the detector to a CW burst that occurs in the presence of long term ambient noise (at the frequency passed by tuner 17 and amplifier-filter 18), whose average detected value is $E_{N1}$. Under such conditions, and prior to the leading edge of the detected CW burst, the voltage across the coupling capacitor at 22 is $E_{N1}-e_T$ volts, with the voltage at the output of the integrator being $E_{N1}$. As previously described, the detected CW burst is amplitude limited at $e_{R0}$ so that the change in voltage integrated by integrator 21 is $e_{R0}-E_{N1}$, and the voltage $e_C$ is caused to exponentially approach the clamp value $e_{R0}$. Where $e_{R0}-E_{N1}$ is less than $e_T$, it can be seen that notwithstanding the length of the detected pulse, the voltage $e_C$ will never rise sufficiently to bring $e_G$ to cut-off with the result that a CW burst cannot cause triggering of the flash tube associated with circuitry 24. Thus, while the receiver will not respond to intermittent noise in the presence of long term noise, neither will the receiver respond to a CW burst under such conditions.

FIG. 6 illustrates an extreme condition wherein the long term ambient noise suddenly commences and has a detected amplitude of $E_{N2}$ which is greater than $e_{R0}$, the clamping value under no noise conditions. After about five time constants associated with limiter 20, the voltage at node 26 will have the value $E_{N2}$ which will be the voltage at which all short duration pulses will be clamped. As a result, neither a noise spike nor a CW burst causes an appreciable change in the voltage at the input to the integrator. Again, the operation of limiter 20 prevents triggering upon the application of a CW burst.

To overcome these deficiencies, the present invention substitutes the limiter circuit shown at 50 in FIG. 7 for the limiter circuit shown at 20 in FIGURE 1. Thus, apparatus 10' is essentially the same as apparatus 10 shown in FIGURE 1 except for the construction of the limiter. Limiter 50 has two branches 51 and 52 connected in series between the output of detector 19 and the reference node of the circuit. Branch 51 may include diode 53 in parallel with resistor $R_2$, although a diode with proper reverse resistance can be used alone. Branch 52 includes capacitor C in parallel with a series combination of resistor $R_3$ and D.C. voltage source $E_{BB}$. The polarity of the diode in branch 51 and the polarity of the D.C. voltage source are related to the polarity of the detector as shown in the drawing. That is, the polarity of the D.C. voltage source opposes the polarity of the voltage $e_A$ representing the unidirectional output of the detector; and the polarity of the diode is such that conduction occurs when the voltage $e_A$ exceeds the voltage $E_{BB}$. With the above-described construction, limiter 50 permits the receiver to properly respond to CW bursts emitted by broadcast means 16 in the presence of long term ambient noise of the same frequency as the CW bursts where such noise has an average value that remains substantially uniform for a period of time long in comparison to the burst interval. In addition, spurious response to intermittent noise spikes whose duration is short compared to the burst interval and which are superimposed on the steady-state noise will still be avoided. As previously indicated, long term ambient noise, such as that due to a running motor or the like, will cause a voltage to appear at the output of the detector which will have some average value and which is referred to as an ambient voltage. If the ambient voltage is substantially constant for a period of time long in comparison to the burst interval, limiter 50 can achieve these new and improved results because the voltage across capacitor C is caused to float at a level above the voltage at the output of the detector. The difference between the voltage on the capacitor and the voltage at the output of the detector, (termed the clamping value for reference) is functionally related to the latter and can be kept larger than the bias voltage $e_T$ on the thyratron. Thus, the peaks of intermittent noise superimposed on the steady-state noise are clamped to the voltage on the capacitor with the result that such intermittent noise pulses are applied to the integrator as a signal which changes amplitude by an amount equal to the clamping value. Since the duration of such intermittent noise pulses is too short to change the output voltage of the integrator by an amount sufficient to overcome the bias voltage $e_T$ on the thyratron, spurious triggering of the flashtube by this type of noise is prevented. However, CW bursts superimposed on the steady-state noise, and amplitude limited to the clamping value have a duration long enough to permit the resultant change in the output of the integrator to raise the bias on the thyratron to cut-off and thus cause triggering of the flashtube to occur.

Figure 8:
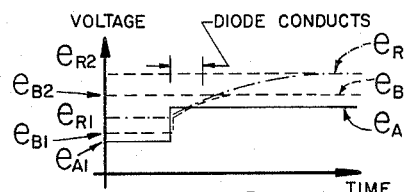
FIG. 8 is a time diagram of various voltages associated with the limiter under two different steady-state noise levels and showing the transient response of the limiter.

To explain the operation of limiter 50, it will be assumed that receiver 12' has been in an environment wherein long term ambient noise of a frequency that is the same as that of the CW bursts has existed for a time long enough for any transients associated with the limiter to die out. In such case, the output of the detector will be a substantially constant voltage, $e_{A1}$ for example, as shown in the time diagram of FIG. 8. Since a steady-state condition exists, the input to integrator 21 will be a constant voltage, $e_{B1}$ and the voltage on capacitor C will be a constant voltage $e_{R1}$, related to the circuit parameters as follows:

$$e_{B1} = \left(\frac{R_2+R_3}{R}\right)e_{A1} + \left(\frac{R_1}{R}\right)E_{BB}$$

$$e_{R1} = \left(\frac{R_3}{R}\right)e_{A1} + \left(\frac{R_1+R_2}{R}\right)E_{BB}$$

where $R=R_1+R_2+R_3$. It should be noted that under such steady-state conditions, $e_C=e_{B1}$ and $e_G=-e_T$.

The bias on diode 53 is the difference between $e_{R1}$ and $e_{B1}$:

$$e_{R1} - e_{B1} = \left(\frac{R_2}{R}\right)(E_{BB} - e_{A1})$$

By making the voltage $E_{BB}$ larger than any likely ambient voltage associated with long term steady-state noise, diode 53 will be reverse-biased. As a result, the clamping value is the difference between $e_{R1}$ and $e_{B1}$.

Assume now that the ambient voltage abruptly jumps from the value $e_{A1}$ to $e_{A2}$ which exceeds $e_{R1}$. Because the voltage on capacitor C cannot change instantaneously, the voltage $e_B$ follows the abrupt change until diode 53 is forward biased, at which time capacitor C begins to exponentially charge toward its new steady-state value $e_{R2}$ (dependent on $e_{A2}$). However, when the voltage $e_R$ reaches the value $e_{B2}$, conduction of the diode ceases and the voltage at the input to the integrator remains at its steady-state value $e_{B2}$ while the capacitor continues to charge toward its steady-state value $e_{R2}$ with a new time constant. During conduction of the diode, the time constant is $(R_1//R_3)C$; and when the diode ceases conduction, the time constant is $[R_3//(R_1+R_2)]C$. By proper selection of parameters, the time constant associated with diode conduction can be made long in comparison to the burst interval, so that during such interval the input voltage to the integrator is essentially a flat-topped pulse. For example, the burst interval may have a magnitude of the order of 10 milliseconds. With $R_1=1M$ ohm, $C=10$ $\mu f$, and $R_3=27M$ ohm, the time constant is about 10 seconds or about $10^4$ times longer than the burst interval.

Figure 9:
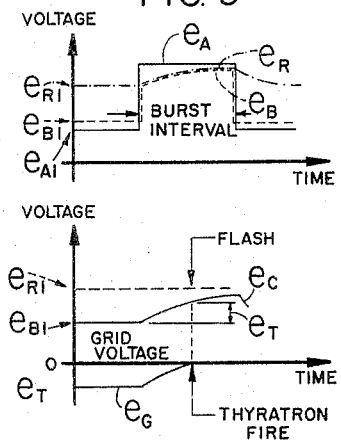
FIGS. 9, 10 and 11 are time diagrams associated with the apparatus of FIG. 7, each figure having a first diagram showing the input voltage to the integrator and a second diagram showing the output voltage of the integrator.

The superposition of a CW burst onto long term ambient noise is shown in the top portion of FIG. 9 where curve $e_A$ represents the voltage at the output of the detector. Since the peak of the output exceeds $e_{R1}$, the voltage at the input to the integrator $e_B$ rises from $e_{B1}$ to $e_{R1}$ and then remains substantially constant for the reason indicated above until the CW burst terminates. The essentially step-function input to the integerator is integrated producing a time-variable voltage on the capacitor of the integrator that starts at $e_{B1}$ when the CW burst commences and exponentially increases toward the value $e_{R1}$. The voltage across capacitor 54 of coupling circuit 22 just prior to the CW burst is $e_{B1}-e_T$, this difference remaining substantially constant during the burst interval. As a result, the voltage on the grid of tube 23, which was at $-\textcircled{R}_T$ volts just prior to the CW burst exponentially increases until cut-off is reached and tube 23 fires causing circuitry 24 to produce an impulse of light. Thus, limiter 50 permits the receiver to respond to CW bursts in the presence of long term ambient noise, something that limiter 20 prevents. It should be noted that after the termination of the CW burst, the limiter automatically adjusts itself to the same quiescent conditions that existed prior to the CW burst. That is to say, the voltage at the input to the integrator returns to $e_{B1}$, the voltage across capacitor C returns to $e_{R1}$ and the voltage at the grid of tube 23 returns to $-e_T$ as circuitry 24 recovers in preparation for the next CW burst.

Figures 10, 11:
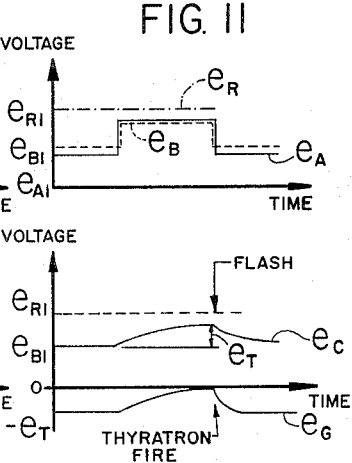

The operation of the limiter upon the application thereto of a large noise spike is shown in FIG. 10. Because the limiter circuit has adjusted to the ambient long-term steady-state noise level, the amplitude of the noise spike is clamped at $e_{R1}$ as previously described. Since a short duration pulse will not permit the voltage at the output of the integrator to change by an amount sufficient to raise the bias on tube 23 above cut-off before the termination of the pulse, tube 23 remains cut-off and circuitry 24 does not produce an impulse of light.

FIG. 11 shows the result of a CW burst when receiver 12' is moved beyond the ordinary range of the apparatus, the latter being defined as the distance at which the amplitude of the CW burst as detected exceeds $e_{R1}-e_{B1}$. In other words, the detected CW burst is not amplitude-limited under such condition. However, proper operation can still occur provided the CW burst lasts sufficiently long and has an amplitude that exceeds the value $e_T$. The impulse of light will occur somewhat subsequent to the instant of maximum shutter opening but may still occur before the shutter begins to close.

Because the clamping value is functionally dependent on the ambient voltage, which can of course be zero when there is no ambient noise, the time for the integrator to develop the trigger voltage will be dependent upon the ambient voltage. However, this dependence does not in fact significantly change the instant at which the flash occurs. To appreciate this, consider that receiver 12' is designed to cause tube 23 to conduct at exactly the correct time relative to the leading edge of the CW burst when the ambient voltage is $e_{A1}$. If the actual ambient noise is $e_{A2}$ given by:

$$e_{A2} = e_{A1}(f+1)$$

where $f$ is the fractional change in the design ambient noise and can have the value $-1$ when there is no ambient noise, then the actual clamp value associated with the actual ambient voltage is:

$$e_{R2} - e_{B2} = (e_{R1} - e_{B1}) + \left(\frac{R_2}{R}\right)f(e_{A1})$$

The fractional variation F in the clamp value due to the fractional variation $f$ in the design ambient noise is:

$$F = \frac{f}{1 - \frac{E_{BB}}{e_{A1}}}$$

From the above, it can be seen that if $E_{BB}$ is the B+ supply for operation of thyratron 23 and the charging of the power condenser for the flashtube contained in circuitry 24, then the order of magnitude of $E_{BB}$ is 400 volts. If the design ambient voltage is 100 volts, it can be seen that fractional changes in the ambient voltage from the design voltage causes only about ⅓ the change in the clamp value. For example, if $e_{A1}=100$ volts, $R_1=330K$ ohm, $R_2=1M$ ohm, $R_3=27M$ ohm, the clamp value is 10.7 volts. If the noise level increases to 200 volts (a 100% change), the clamp value changes to 7.2 volts, a change of only $-33\%$. On the other hand, if the noise level decreases to 0 volts (a 100% negative change), the clamp value changes to 14.4 volts, a change of only $+33\%$.

Figure 12:
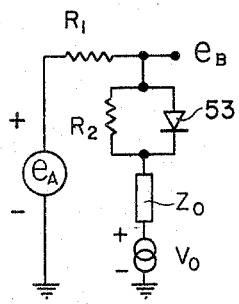
FIG. 12 is a thevenin equivalent circuit of a limiter made in accordance with the present invention.

By taking the Thevenin equivalent of limiter 50 and considering detector 19 as a unidirectional voltage generator with a source impedance of $R_1$, the circuit of FIG. 12 results. Thus branch 52 is constituted by a frequency sensitive impedance $Z_\theta$ in series with a frequency sensitive voltage generator $V_\theta$. These terms have the following values:

$$Z_\theta = \frac{1}{R_3C_s+1}$$

$$V_\theta = \frac{1}{s}\left[\frac{E_{BB}+\gamma R_3C_s}{R_3C_s+1}\right]$$

where $\gamma$ is the initial voltage across the capacitor and $s$ is the complex variable associated with the Laplace transform. It is thus apparent that the exact configuration of branch 52 is not critical as long as it generally is of the type having a frequency sensitive voltage and impedance as of the type indicated above. It is essential for proper operation, however, for the parallel resistance in branch 51 to be small enough to permit sufficient current to flow when ambient voltage is present at the output of the detector to back bias diode 53.

For reference purposes, it may be considered that the voltage $e_C$ must change by a value no less than the bias voltage $e_T$ in response to the output of the detector if the flash tube is to be triggered, regardless of the initial level of $e_C$. Thus, for any ambient conditions producing an ambient voltage $e_{B1}$ at the output of the detector, which constitutes the initial level of $e_C$, there is a trigger voltage $e_{B1}+e_T$ that the output of the integrator must reach in the time interval between the closing of the "M" contacts and maximum shutter opening if the flash tube impulse is to be synchronized properly with the camera shutter.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In combination with a camera having a pair of flash contacts whose closing occurs prior to maximum shutter opening, and transmitter means responsive to the closing of said contacts for broadcasting a burst of CW signal of predetermined frequency commencing a preselected time prior to maximum shutter opening, flash apparatus remote from the camera for producing, a maximum shutter opening, an impulse of light to illuminate the scene being photographed, said flash apparatus comprising:
    (a) tuner means to selectively pass signals of said predetermined frequency;
    (b) detector means for detecting the output of said tuner means, said output including a substantially constant ambient voltage associated with ambient noise of said predetermined frequency whose duration is long in comparison to said preselected time;
    (c) integrator means having an input and an output and being constructed and arranged so that its response to a step function input of predetermined value reaches a trigger voltage in a period of time substantially equal to said preselected time;
    (d) a flashtube;
    (e) voltage sensitive means responsive to the output of said integrator for triggering said flashtube to produce an impulse of light when the voltage at the output of said integrator reaches said trigger voltage; and
    (f) limiter means interposed between said detector means for establishing a clamping value above said ambient voltage such that abrupt changes in the output voltage of said detector means lasting for said preselected time are limited before being applied to said integrator means.

2. Apparatus in accordance with claim 1 wherein said limiter means is further constructed and arranged so that the difference between said clamping value and said ambient voltage is substantially equal to said predetermined value.

3. Apparatus in accordance with claim 1 wherein the voltage at the output of said detector means is measured from a reference, and said limited means includes:
    (a) a diode having one end connected to the connection between the output of said detector means and the input to said integrator means;
    (b) a frequency sensitive impedance connected in series with said diode;
    (c) a frequency sensitive voltage source connected between said impedance and said reference; and
    (d) said diode having a polarity such that it conducts when the output of said detector exceeds the voltage of said voltage source.

4. Apparatus in accordance with claim 3 wherein the combination of said frequency sensitive impedance and said frequency sensitive voltage source is defined by a capacitor in parallel with a series arrangement of a constant voltage source and resistance means.

5. Apparatus in accordance with claim 4 wherein the polarity of said constant voltage source is opposite to the polarity of said diode.

6. Apparatus in accordance with claim 5 wherein the time constant of said limiter means associated with the charging of said capacitor when said diode conducts is long compared to said preselected time.

7. In combination with a camera having a pair of flash contacts whose closing occurs prior to maximum shutter opening, and transmitter means responsive to the closing of said contacts for broadcasting a burst of CW signal of predetermined frequency commencing a preselected time interval prior to maximum shutter opening, flash apparatus remote from the camera for producing, at maximum shutter opening, an impulse of light to illuminate the scene being photographed, said flash apparatus comprising:
    (a) tuner means to selectively pass signals of said predetermined frequency;
    (b) detector means for detecting the output of said tuner means, said output including a substantially constant ambient voltage associated with ambient noise of said predetermined frequency whose duration is long in comparison to said preselected time interval;
    (c) integrator means having an input and an output and being constructed and arranged so that its respone to a step function input of predetermine value reaches a trigger voltage in a period of time substantially equal to said preselected time interval; and
    (d) limiter means interposed between said detector means and said integrator means for establishing a clamping value above said ambient voltage and functionally dependent thereon such that abrupt changes in the output voltage of said detector means are limited to said predetermined value before being applied to said integrator means.

References Cited by the Examiner
UNITED STATES PATENTS

| | | | |
|---|---|---|---|
| 2,419,978 | 5/1947 | Wildman | 95—11.5 |
| 2,902,610 | 10/1959 | Sample | 307—106 |
| 3,153,195 | 10/1964 | Kille | 325—102 |

JOHN M. HORAN, *Primary Examiner.*